July 2, 1935.  T. P. HALL  2,007,086
AIRPLANE
Filed Sept. 19, 1933   5 Sheets-Sheet 1

Inventor
Theodore P. Hall

By Albert E. Jacobs
Attorney

July 2, 1935.  T. P. HALL  2,007,086
AIRPLANE
Filed Sept. 19, 1933   5 Sheets-Sheet 2

July 2, 1935.  T. P. HALL  2,007,086
AIRPLANE
Filed Sept. 19, 1933  5 Sheets-Sheet 3

Inventor
Theodore P. Hall
By
Albert E. Fech. Attorney

July 2, 1935.　　　　T. P. HALL　　　　2,007,086
AIRPLANE
Filed Sept. 19, 1933　　　5 Sheets-Sheet 5

Inventor
Theodore P. Hall
By
Attorney

Patented July 2, 1935

2,007,086

UNITED STATES PATENT OFFICE 2,007,086

AIRPLANE

Theodore P. Hall, Kenmore, N. Y.

Application September 19, 1933, Serial No. 690,149

45 Claims. (Cl. 244—12)

This invention relates to certain improvements in airplanes, and particularly to wings therefor of the so-called variable or high lift types; and the nature and objects of the invention will be readily recognized and understood by those skilled in the aeronautical art in the light of the following explanation and detailed description of the accompanying drawings illustrating what I at present consider as the preferred embodiments or mechanical and aerodynamic expressions of my invention from among various other forms, designs, arrangements, combinations and constructions, of which my invention is capable within the spirit and the scope thereof.

It is the so-called flap types of high or variable lift wings that my invention is primarily and especially concerned with, that is, such types of wings in which a flap is mounted on the wing for manually or automatically controlled movements to and from positions thereon at which the lift capacity of the wing is increased. Generally, such flaps are of the trailing types; and in their normal position form a portion of and carry out the normal high speed airfoil section and contour of the wing; while in their lift capacity increasing positions on the wing, they are swung or moved downwardly from the wing to change the wing airfoil section or profile and increase the camber of the wing with the resulting increase in wing lift capacity. With such flap wings, as the essential function of the flap is to vary wing camber in order to vary lift, the flap is usually mounted on the wing for vertical swing on an axis adjacent the leading edge of the flap, which axis is fixed against substantial vertical movement, so that when the flap is swung downwardly from normal raised position to positions of increased positive angles relative to the normal wing, it forms a substantial continuation and a camber increasing portion of at least the under surface of the wing.

The functioning of a flap wing of the foregoing general types is limited in all conditions of flight where an increase in wing lift capacity is desired, to a swinging or movement of the flap to a camber increasing position. Such flap wings do not permit of any selective or varied operation of the flap by which an increase in the wing lift capacity can be obtained by a positioning and relative functioning of the flap and wing to vary or change other wing characteristics or set up other conditions to increase wing lift other than by essentially changing wing camber.

A main object and a fundamental feature of my present invention is to provide a design of variable or high lift wing of the flap type, in which the wing flap is operable to increase wing lift capacity by either varying the wing camber by increasing the positive angle of the flap relative to the wing, or by varying the effective area of the wing and obtaining an increased lift effect from the combination of flap and wing by positioning the flap spaced bodily from the wing in aerodynamic inter-relation therewith without substantially varying the normal angle of the flap relative to the wing.

Another object and a feature of the invention is the provision of such a design of flap wing in which the flap in moving from its normal position on the wing to its maximum lift increasing position extended from the wing passes through two phases; in the first of which the wing flap moves bodily from the wing without substantial change in angle relative to the wing into a lift increasing position spaced bodily from and increasing the effective area of the wing; while in the second of which the flap is rotated to increase its angle of attack relative to the wing to thereby, among other results, increase, in effect, the wing camber and also augment the air circulation about the combined flap and wing to thus further increase the lift capacity of the combination.

A further object is to utilize the characteristics of the flap design of the invention to provide for an efficient automatic operation and control of the flap by and in accordance with flight conditions, through the provision of a relative mounting of the flap and relative location of its axes on the wing so that the flap is bodily moved to and from normal position on the wing without change in its angle relative to the wing by variations in speed of flight, while the angle of the flap is changed by center of pressure variations thereon resulting from variations in the angle of attack of the wing, the vertical bodily movements of the flap and its angle changing movements being separately or simultaneously carried out.

Another general characteristic of the flap wing of the invention is the design, mounting, and arrangement of the wing flap by which the angle of the flap relative to the wing is variable by rotation of the flap for vertical swinging in any flap position, including normal position of the flap on and forming a portion of the normal airfoil section and contour of the wing; and a feature of the invention resides in forming the flap as a trailing under surface portion of the wing below a vertically swingable aileron section of the wing so that the flap in its normal position vertically swings with the aileron section as a unit control surface for lateral control when the flap and wing are in their normal high speed relation.

Variable or high lift wings of the flap types hereinbefore generally referred to, present certain inherent problems and difficulties arising out of lateral control surface or aileron locations on a wing relative to wing flaps, and arising out of the difficulty of obtaining the proper and effective balanced aileron control for the low attack angle or high speed flight condition, and further arising out of the difficulty of obtaining an effective control in the high attack angle, low speed, or stalling condition of flight without augmenting the stall condition. For example, when the wing is near the stall, further dropping of the conventional aileron increases the camber of the wing upper surface tending to cause the air to break away or stall the wing, which is the opposite effect desired when that particular aileron is dropped in the lateral control operation. Therefore, it is a distinct advantage to maintain the wing upper surface at approximately the same camber while increasing the circulation over the wing section, and consequently the lift, by deflecting the trailing edge portion of the lower surface only of the wing downward in such lateral control operation of an aileron.

One of the objects of the present invention is to materially reduce these lateral control problems by utilizing the flaps themselves when in their extended wing lift capacity increasing positions on the wing, as the lateral control surfaces or ailerons for the wing when under high attack angle or low speed flight conditions; and a feature of the invention is the presentation of a design and arrangement of flap wing in which the flaps in their normal positions operate as units with ailerons on the wing for lateral control under normal low angle or high speed flight conditions, while in their extended lift increasing positions under high angle of attack or low speed wing flight conditions, the flaps themselves are operable also as the lateral control surfaces for the wing substantially independently of and without essential lateral control contribution by the normal wing ailerons.

Another object of the invention is to provide an arrangement of operating system for manual control of a flap wing embodiment of the invention, by which a pilot can actuate the wing flap or flaps to a lowered position spaced from the wing without change in flap angle relative to the wing, and then in any such lowered position can rotate the flaps to increase their angle of attack and assume positions relative to the wing such as to in effect increase wing camber and increase the lift capacity of the wing; and a further feature resides in the incorporation and interconnection into such flap control system of a lateral control mechanism for independent differential actuation of the flaps for lateral control in all positions thereof, including normal flap position.

The invention also includes as an object, the operative interconnection with the automatically operating forms of the flap wing of a pilot actuated lateral control system for lateral control operation of the automatically functioning flaps.

Another object is to design and mount a flap having the general characteristics above referred to, on a wing having conventional trailing ailerons or lateral control surfaces; so that in normal raised position, the flap is forward of the ailerons, but when moved to lift increasing positions spaced from the wing, is disposed aft of such normal raised position.

A further feature of the invention that has as its object the prevention of small changes in position of a flap due to minor air disturbances acting thereon, resides in the provision of a force means acting on the flap and which changes its signs of force so as to hold the flap in any particular position the flap may assume in operation.

With the foregoing general objects, features and results in view, as well as certain others that will be clearly brought to light by the following explanation, my invention consists in certain novel features in designs and in constructions and arrangements of elements and parts,—all as will be more fully and particularly referred to and specified hereinafter.

Referring to the accompanying drawings, in which similar reference characters refer to corresponding parts and elements throughout the several figures thereof.

Fundamentally, in accordance with my invention, a variable or high lift wing thereof includes a wing flap member that in its normal position forms a part of the normal wing to carry out the normal high speed airfoil section and contour of the wing. This flap is capable of bodily movement, without changing its angle of attack relative to the wing, to a position spaced below and in a generally parallel relation with the wing, and is also swingable or rotatable vertically about an axis spanwise thereof to increase its angle of attack relative to the wing.

Figure 1:
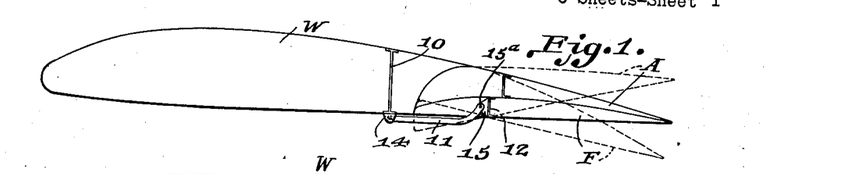
Fig. 1 is a diagrammatic vertical transverse section through a form of flap wing of my invention in which the flap is mounted below an aileron for cooperative functioning therewith; the flap and aileron being shown in their normal positions.
Figure 2:
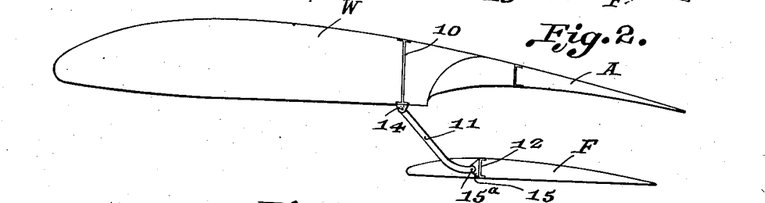
Fig. 2 is a view similar to that of the wing of Fig. 1, but showing the flap in lowered position spaced below and in wing area increasing, relation with the wing.
Figures 3, 4, 5:
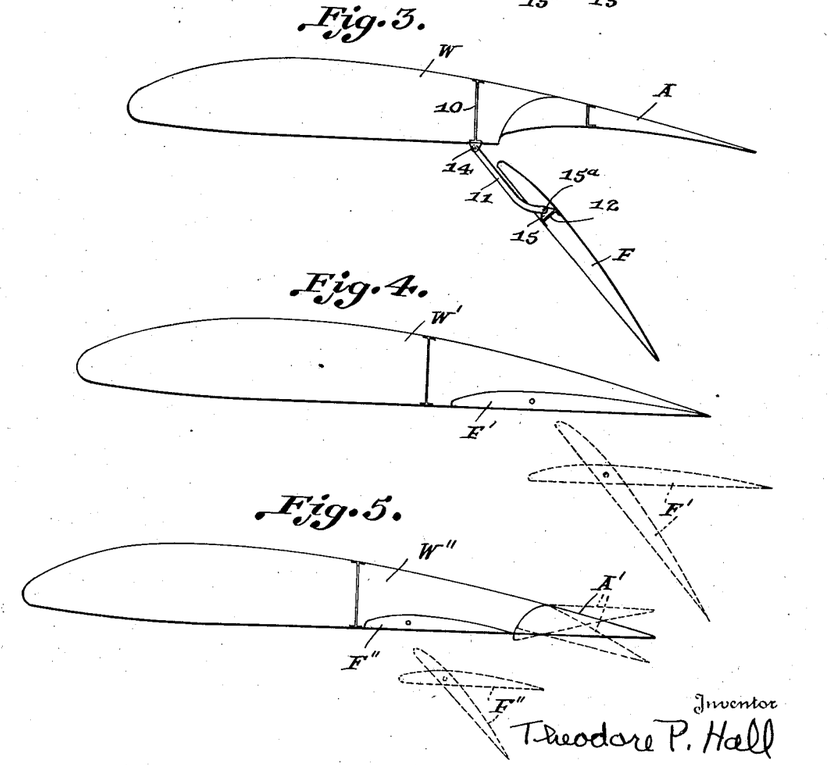
Fig. 3 is a view of the wing of Fig. 2, showing the lowered flap rotated or swung to increase its angle of attack and assume a position increasing wing lift capacity by, in effect, increasing wing under surface camber.
Fig. 4 is a diagrammatic view in transverse cross-section through a wing of the invention in which the flap is mounted as a trailing under portion of the wing without co-operating aileron thereabove; and showing in dotted outline, the position of the flap lowered and moved aft of its normal position without angle change relative to the wing; and the position of the lowered flap to increased angle of attack relative to the wing.
Fig. 5 is a diagrammatic transverse section through a design of wing of the invention in which the flap in normal raised position is located forward of a conventional trailing aileron, and in its lowered lift increasing positions is moved aft of its normal position and partially below the aileron.

For instance, I have diagrammatically illustrated one form of wing W of the invention in Figs. 1 to 3 of the accompanying drawings, as including the wing flap F for functioning in accordance with the principles of the invention. The flap F is normally positioned in a properly shaped recess formed in the rear under surface of wing W, so that the flap in its normal position received in such recess forms and carries out the trailing or rear under surface contour of the normal or high speed airfoil section of the wing W, as clearly shown by Fig. 1 of the drawings. In such form of the wing, an aileron A for vertical swinging is mounted on the wing W above and in the example hereof substantially coextensive chordwise with the flap F, and such aileron forms the upper trailing surface of the wing. Thus, the wing recess for receiving flap F in such wing embodiment is formed in the under surface of the aileron A with the flap in normal raised position recessed in the under side of the aileron and forming therewith the trailing or rear portion of the normal or high speed airfoil section of wing A.

The flap F is so mounted on wing A as to be bodily lowered to a spaced position therebelow and in general parallel relation therewith, the mounting for the flap being such as to maintain flap F during such bodily downward movement against substantial variation of its normal angle relative to the wing. Such downward position of the flap is illustrated in Fig. 2 of the drawings, and functions to increase lift capacity of wing W by increasing the effective area of the wing and increasing the drag through the effects formed by the relative positions of the wing and flap.

Following the teachings of my invention, the flap F is so mounted as to be rotatable around an axis spanwise thereof and in this particular instance spaced rearwardly or aft of the flap leading edge, in order to change the angle of attack of the flap, that is, its angle relative to the wing. Such movement or angle changing rotation of the flap in the wing of Figs. 1 to 3, is illustrated by Fig. 3, in which flap F is shown rotated to its maximum positive angle of attack relative to the wing W, with the flap in its maximum bodily lowered position spaced below the wing. In this position of flap F, the under surface camber of the wing W is substantially increased in effect by the position of the flap, the flap leading edge being positioned to reduce the gap between it and the wing under surface and the circulation of air about the combination of wing and flap is increased with substantial drag increase and resulting further increase in wing lift over the increase obtained by the flap in its bodily lowered substantially parallel position below the flap.

The arrangement and mounting of flap F on the wing W is characterized by the fact that the flap F is vertically rotatable or swingable about its span-wise axis to vary its angle relative to the wing, in any lowered position of the flap, as well as in its normal raised position of Fig. 1, and this characteristic is utilized with the flap in its normal raised position to obtain lateral control functioning of the flap F with the aileron A thereabove as a unit control surface when flap and aileron are together in their normal positions carrying out the normal high speed airfoil section of wing W. The lateral control functioning of the flap F and aileron A as a unit when in their normal positions on wing W, is indicated by dotted lines in Fig. 1 of the drawings.

However, lateral control with the flap F in its lowered lift increasing positions for low speed or high attack angle flight of the wing W, is obtained essentially through lateral control functioning of the flap which is formed of opposite separate sections spanwise of the wing, which functioning takes places substantially independently of the ailerons A of the wing and without material lateral control contribution by the ailerons. Such lateral control by flaps F is carried out by differential actuation thereof when in their bodily lowered positions and with but minor relative movements of the ailerons, A. Preferably, lateral control operation of flaps F in their lowered positions may be accompanied by relatively small corresponding movements of the ailerons A thereabove, but mainly for the purpose of efficiently resetting the ailerons on the wing during lateral control functioning of the flaps.

The cooperating flap and aileron arrangement and design of Figs. 1 to 3, is not in all respects essential to a flap wing design of the invention, as independent ailerons of conventional types, or other lateral control members, can be employed independently of the wing flap. For example, in Fig. 4, of the drawings, a wing W' is disclosed in which the wing flap F' of the invention is recessed in the undertrailing or rear portion of the wing for functioning as generally described in connection with flap F of Figs. 1 to 3. In the wing W', the portion thereof above flap F' is fixed structure, and the lateral control members for the wing are carried at locations on the wing removed from the flap locations. The flap F' is shown in its lift increasing positions of substantial parallelism with the wing, and of increased angle relative to the wing, in dotted outline. With the wing design of Fig. 4, lateral control functioning of separate flaps F' thereon can be carried out as explained above, with the flaps in their lowered, wing lift increasing positions, or lateral control may be had entirely through the medium of the lateral control members for the wing.

In another adaptation of the invention, a flap wing design of Fig. 5, is presented, in which the wing W'' is provided with conventional trailing lateral control members or ailerons A', and the flap F'' of the invention is recessed in the wing when in normal position forward of the trailing aileron A'. In this arrangement, the flap or flaps F'' are so mounted and actuated that in lowered position, a flap moves down and to the rear without change in angle relative to the wing W'', into the position spaced below the wing and aileron A', as indicated in dotted outline in Fig. 5, of the drawings. When in any lowered position, flap F'' is then rotatable or swingable to increase its angle of attack in accordance with the principles of the invention, such an increased angle position being also indicated in dotted outline in Fig. 5.

Figures 6, 7, 15, 16:
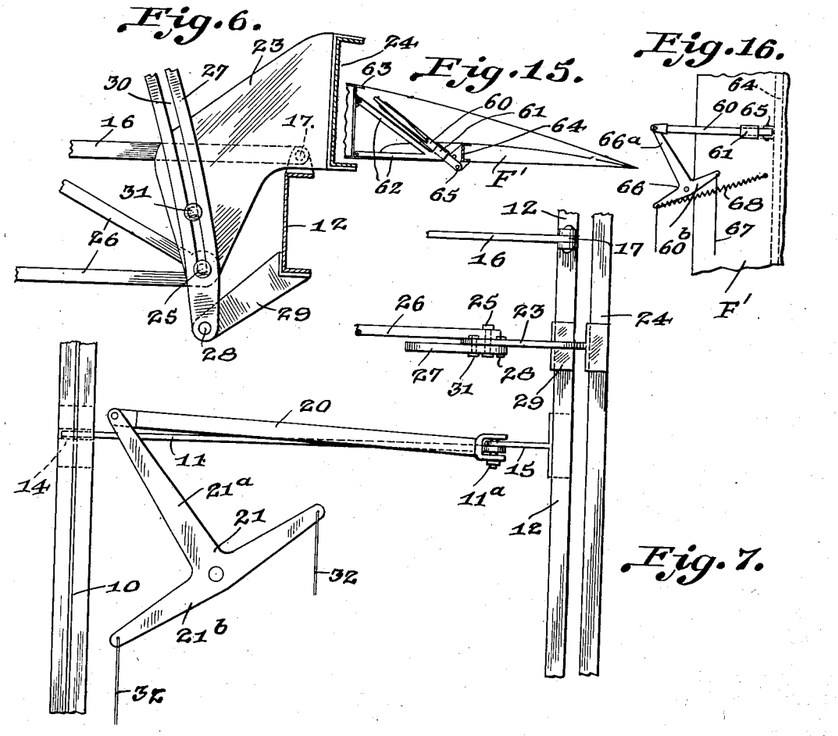
Fig. 6 is an enlarged vertical sectional view taken as on the line 6—6, of Fig. 12, showing portions of the mechanism operatively coupling the flap and the aileron of the wing of Figs. 1 to 3.
Fig. 7 is a top plan view, more or less diagrammatic, of a portion of a wing of Figs. 1 to 3, showing parts of the flap and aileron operating and controlling mechanism.
Fig. 15 is a more or less diagrammatic view in elevation of a modified wing flap mounting and operating mechanism, particularly adapted for use with a form of wing such as shown in Figs. 4 and 5.
Fig. 16 is a view in top plan, more or less diagrammatic, of the flap mounting and a portion of the flap operating mechanism of Fig. 15.
Figure 8:
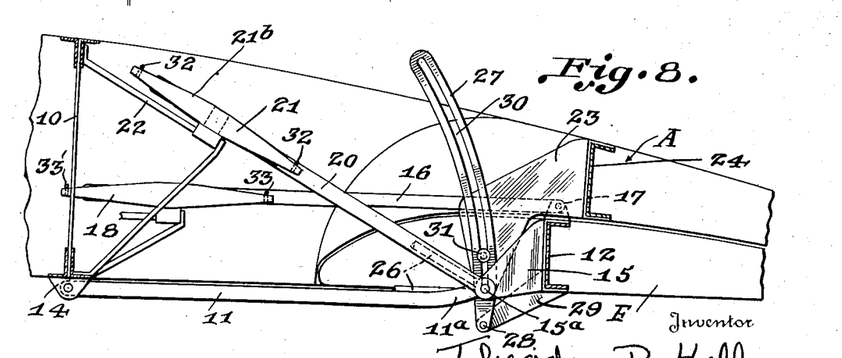
Fig. 8 is an enlarged vertical section, more or less diagrammatic, and taken as on the line 8—8, of Fig. 12, showing the flap and aileron with parts of the operating and control mechanism, all in normal position on the wing.

In a possible embodiment and arrangement of a wing design of Figs. 1 to 3, having the interconnected and interrelated flap F and aileron A, referring here to Figs. 6, 7 and 8 of the drawings in particular, taken in connection with Figs. 1 to 3, the wing W, is shown more or less diagrammatically as including the rear wing beam or spar 10 spaced forwardly of the leading edge of the flap F, and aileron section A thereabove, and the flap is movably carried and supported from such spar 10, or equivalent structure of the wing by an arm or arms 11. The flap F includes a spar 12 spaced rearwardly from the leading edge of flap F, say, for example, a distance approximating one-third (⅓) the chord of the flap, although it is to be clearly understood that the invention is not limited to any such spacing, as the spar, which forms the location of the pivotal axis of the flap, can be located at any desired or expedient location on the flap. The arm 11 is pivotally connected for vertical swinging at its forward end to a pivot or bearing bracket 14 fixed at the under side of the wing, preferably as shown to the spar 10, and extends rearwardly and is pivotally connected at its rear or after end, to a bearing bracket 15 carried by and fixed to spar 12 of flap F.

Figures 10, 11:
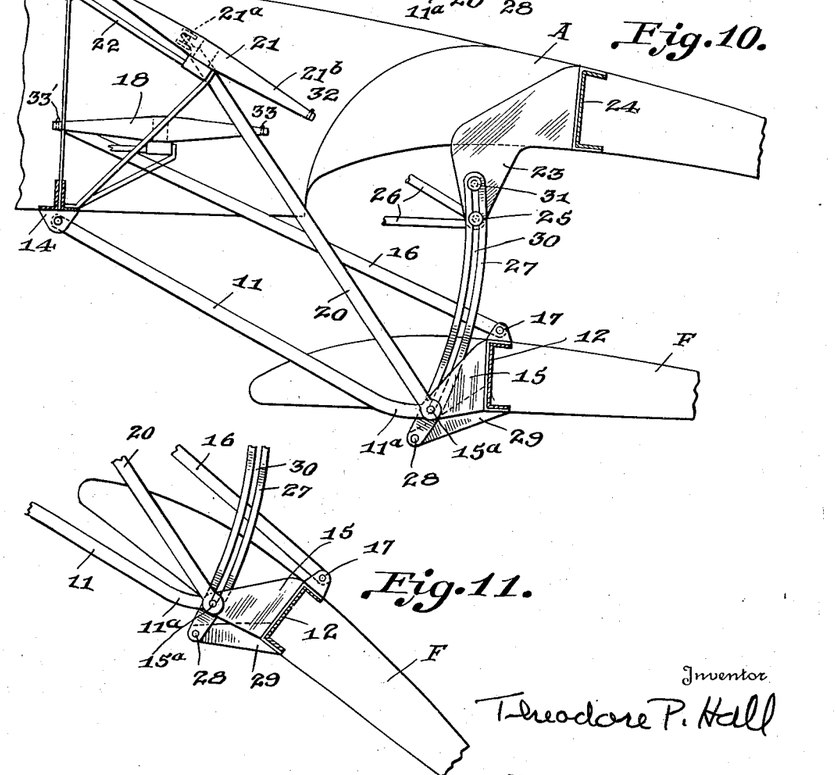
Fig. 10 is a view similar to Fig. 8, but showing the wing flap lowered to position spaced below the wing without changing the flap angle relative to the wing.
Fig. 11 is a view of the flap in its lowered position of Fig. 10, but with the flap rotated to increase its angle of attack relative to the wing, only portions of the flap operating and control mechanism being shown.

The bearing bracket 15 extends forwardly from spar 12 and carries the horizontal transversely disposed pivot pin 15a disposed in a plane in proximity to the under side of flap F, in the particular example hereof. The flap supporting arm 11 extends rearwardly along and in proximity to the under surface of wing W, a distance rearwardly beyond the leading portion of the flap F in its normal raised position, and terminates in the upwardly bent or curved after end 11a that is pivotally secured on pin 15a of flap carried bracket 15. The flap is thus bodily movable downwardly with and carried by the downwardly swingable arm 11, which arm swings or pivots from its forward end on wing carried bearing bracket 14. Due to the pivotal mounting of the flap to the arm 11 at the bearing 15a, the flap can be maintained in its substantially normal parallel relation to the wing without change in normal angle relative to the wing, as the flap moves downwardly into its lowered lift increasing position of Fig. 2. The flap F is provided with a vertical slot therethrough above the arm 11, to permit the arm to pass therethrough as the flap and arm move downwardly with the flap maintained in horizontally disposed position, as indicated by Figs. 2, and 10, of the drawings.

While but one arm 11 is illustrated in the accompanying drawings for purposes of explanation, any required number spaced along the span of the wing in order to properly carry and support the flap F are provided, and the flap is suitably slotted above each arm 11 for arm and flap clearance, as explained in connection with the arm and flap arrangement and mounting shown in the drawings.

In its bodily lowering and raising movements on the swinging arms, the flap F is maintained normally in its substantially parallel relation with the wing against change in angle, by a link 16, referring to Figs. 6, 7 and 8, that is pivotally connected at 17 to the upper side of the flap spar 12 and extends forwardly across the leading or forward portion of flap F, through aileron section A that is suitably vertically cut out or slotted to relatively movably receive the same, to the crank 18 in the wing W. The crank 18 is of the T-type and is horizontally disposed for rotation on a vertical axis with its central arm 18a (referring here to Figs. 12 and 13 in particular) disposed generally longitudinally of the wing and its cross arm 18b disposed generally chordwise of the wing. The link 16 is connected pivotally at its forward end to the outer end of arm 18a of crank 18, by a suitable coupling that permits pivoting of the link, both vertically and horizontally. With crank 18 maintained against rotation, when flap F is lowered, the link 16 swings downwardly therewith on the pivotal connection with crank arm 18a and the pivot point 17 on the flap, to hold flap F substantially horizontal and without angle change relative to the wing. In such manner the normal horizontal position of flap F is maintained during bodily lowering and raising of the flap on the swinging arms 11.

Figure 12:
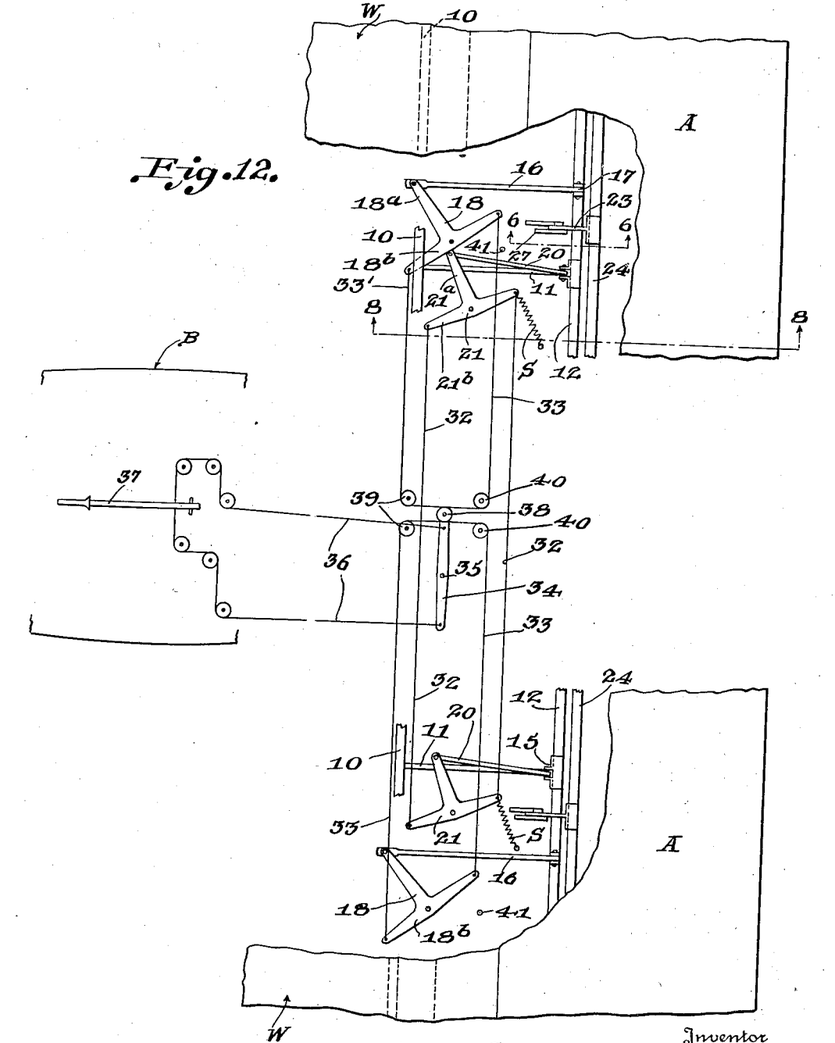
Fig. 12 is a diagrammatic view in top plan of portions of the opposite wings of an airplane, which wings are of an automatically functioning flap form of the invention, and showing schematically a flap control system together with a lateral control actuating system interconnected into and with the flap control system for lateral control operation of the wing ailerons and flaps.
Figures 13, 14:
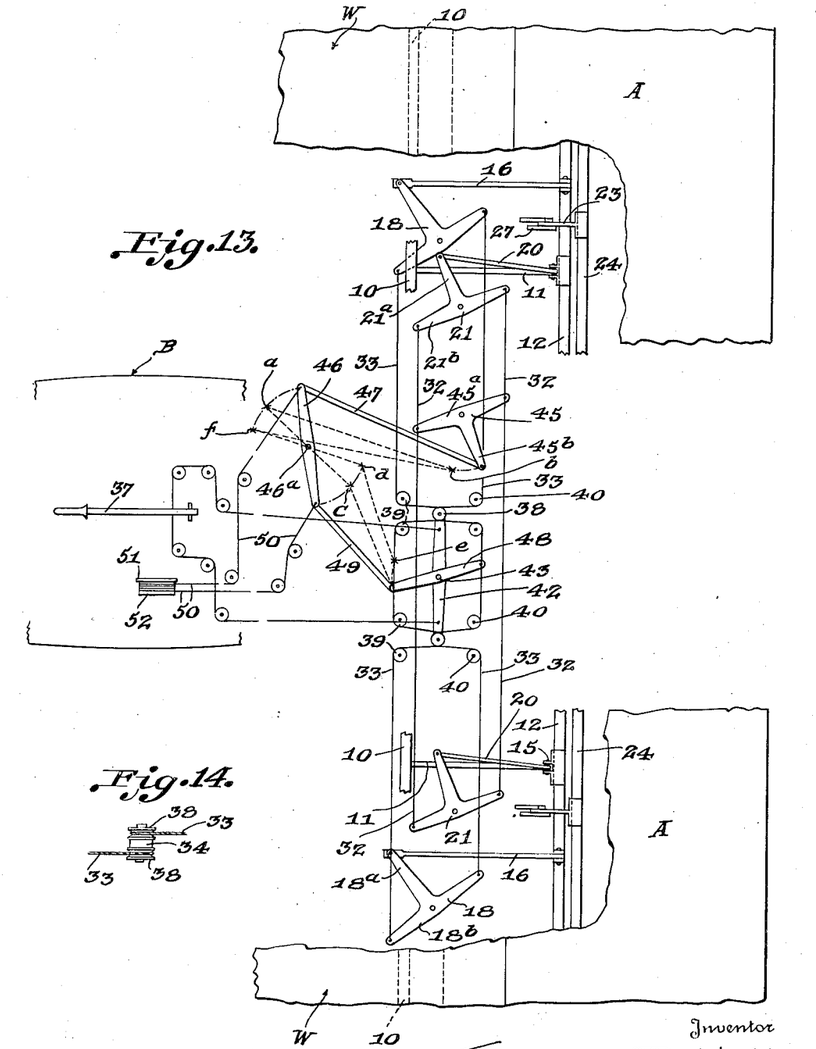
Fig. 13 is a diagrammatic view in top plan of portions of the opposite wings of an airplane, but which wings are of a manually controlled flap type of the invention, and showing schematically a manually operated flap actuating and controlling system, together with a lateral control system interconnected therewith for lateral control actuation of the wing flaps and ailerons.
Fig. 14 is a detail view in end elevation of the crank and pulley arrangement by which the lateral control systems of Figs. 12 and 13 are interconnected into the flap controlling and operating systems of Figs. 12 and 13.

The link 16 and the crank 18 are disposed in the wing W spaced a distance along the wing span from the adjacent swinging arm or arms 11, in the example of wing of the invention herein illustrated, as will be clear by reference to Figs. 7, 12 and 13.

The flap F is bodily raised and lowered through the medium of the connecting rod 20 pivotally coupled at its lower or rear end to the pivot pin 15a that provides the axis for angle changing rotation of flap F on one of the swinging arms 11, and this rod 20 extends upwardly through suitable vertical slots formed in the flap and aileron section A, to the outer end of the central arm 21a, of a T-crank 21 mounted in the wing W. In the specific form hereof, this crank 21 is mounted in the upper portion of wing W at a downward and rearward inclination with its central arm 21a generally longitudinally disposed and its cross arm 21b generally chordwise disposed relative to the wing, as clearly shown in Figs. 8, 9 and 10. A supporting truss structure 22 (see Fig. 8) is provided extended rearwardly from wing spar 10, to carry and rotatably support the crank 21 thereon. The forward end of rod 20 is pivotally connected, as by a suitable universal type of pivotal coupling, to the outer end of crank arm 21a, and by rotating crank 21 to swing arm 21a rearwardly the flap F is lowered on swinging arms 11 to its lift increasing positions maintained substantially parallel with and without angle change relative to the wing by the link 16 and crank 18 holding the link against longitudinal, flap angle varying movements.

Figure 9:
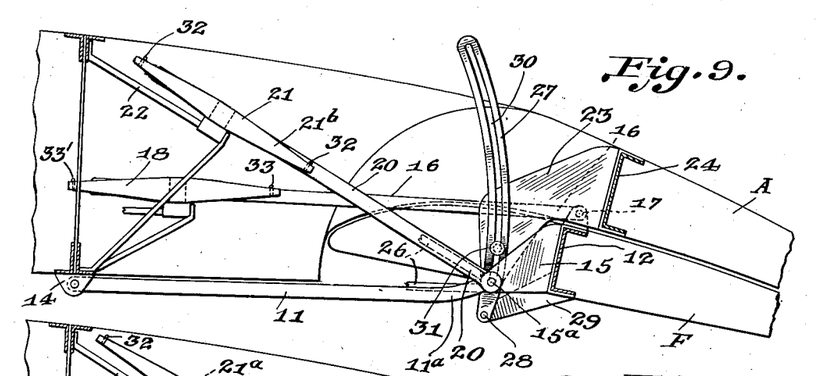
Fig. 9 is a view similar to Fig. 8, but showing the flap and aileron swung downwardly as a unit while in normal position for lateral control during low angle, high speed flight conditions.

The mounting for the flap F on arms 11, by the brackets 15, is such that the flap is vertically rotatable or swingable about the axis defined by pivot points 15a, to change its angle of attack relative to wing W, in any lowered position of the flap, and also in the normal raised position of the flap recessed in the under surface of aileron section A thereabove. This angle changing rotation of the flap about axis 15a is accomplished by swinging crank 21 to throw crank arm 21a rearwardly to force rod 16 rearwardly and downwardly and as rod 16 pivotally connects to the flap at 17, to the rear of and above the flap axis 15a, the flap is rotated into increased angle positions such as shown in Figs. 3, 9 and 10.

A feature of the invention as expressed in the embodiment thereof in the wing design of the type of Fig. 1 resides in the lateral control operation of the flap F and aileron section A, together as a unit control surface when the flap is in its normal raised position of Figs. 1 and 8. This feature is carried out by an interconnection between aileron and flap such that the aileron is vertically swung by vertical swinging of the flap for lateral control when in the raised position, while vertical swinging of the flap for lateral control when in its lowered, lift increasing positions, is accompanied by relatively small corresponding movement of the aileron section A. An example of mechanism for carrying out such interconnection between flap F and aileron section A thereabove, to obtain the relative functioning of these elements, is disclosed in Figs. 6, to 10, of the drawings.

Referring primarily to Fig. 6 of the drawings, such flap and aileron interconnecting and operating mechanism of the particular example hereof, includes a forwardly and downwardly extended bracket or plate member 23 fixed to the spar 24 of the aileron section A. Plate bracket 23 extends forwardly from spar 24 above flap spar 12, and then extends downwardly spaced forwardly of the flap spar. The plate bracket 23 is located in the example hereof spaced from and between adjacent link 16 of the flap angle changing means, and rod 20 of the flap raising and lowering means (see Figs. 7, 12 and 13), and is pivotally mounted at its lower end on a horizontal pivot pin or stub shaft 25 carried at the forward end of a supporting truss 26 on the fixed wing structure, preferably fixed to wing spar 10 and extending forwardly therefrom. Thus aileron section A is pivotally mounted for vertical swinging on an axis defined by pivot 25 that is substantially alined with the axis defined by pivots 15a about which flap F is vertically swingable, and is vertically swingable as a unit with aileron section A when in normal raised position recessed in such aileron.

The operative connection between flap F and aileron section A thereabove by which the aileron A is swung by swinging of the flap, consists in the instant embodiment of a curved and slotted crank member 27 that is pivotally connected at its lower end by the pivot 28 to a downwardly and forwardly extended bracket 29 fixed on the flap spar 12. The bracket 29 extends a distance below the flap with the lower end pivot 28 for crank 27 located below the flap axis 15a. The curved crank 27 is formed with the curved slot 30 longitudinally thereof and extends upwardly and forwardly from pivot 28, with the slot 30 fitted over and slidably receiving the pivot pin of shaft 25 that forms the axis of rotation for the aileron section A. The crank 27 and slot 30 thereof are designed to have a true radius about the axis defined by the pivots 14 for the swinging flap-carrying arms 11, in the example hereof, so that, the aileron will have no motion with horizontal deflection of the flap. However, the crank and slot may be given a curve which changes the angular position of the aileron with downward movement of the flap, if desired or found expedient. The curved crank 27 with the flap F in normal raised position extends upwardly through the flap, aileron and upper surface of the wing, which are all suitably cut away or slotted to receive the crank and permit vertical movement thereof, as well as to allow for fore and aft rocking movements that are imparted to the crank.

The aileron section A is operatively coupled to the crank 27 by a pin 31 that is fixed on the aileron bracket 23 and is slidably received and confined in the slot 30 of the crank. This pin 31 is positioned on bracket 23 so that with the flap F in normal raised position recessed in the under side of aileron section A, it is spaced a distance above the flap axis defined by pivot 15a equal to the distance the lower end crank pivot 28 on bracket 29, is spaced from pivot 15a. With pivots 28 and 31 spaced equal distances at opposite sides of the flap axis, it follows that when the flap F is vertically swung by link 16 on the axis defined by 15a, then bracket 29 is swung to rock crank 27 and through pin 31, to correspondingly swing the aileron section A with the flap. For instance, when the flap is swung downwardly about axis 15a, bracket 29 is moved forwardly to rock the upper portion of crank 27 rearwardly about pivot pin 25 on which the aileron section A is also pivotally mounted, and through pin 31 the aileron section is swung downwardly with the flap as a unit control surface. Such swinging of the flap and aileron together as a unit surface for lateral control is illustrated particularly in Fig. 9, of the drawings.

Now, when the flap F is bodily lowered to wing lift increasing positions spaced below the wing W, referring here to Fig. 10 of the drawings, the slotted crank 27 moves downwardly therewith, sliding on the pins 25 and 31 that are confined in the crank slot. The upper end of crank slot 30 is closed and forms a stop which engages pin 31 to limit lowering of flap F to its maximum lowered position of Fig. 10. This downward movement of the flap while held against angle change by link 16, is carried out without causing movement of aileron section A because the pins 25 and 31 are on a true radius about axis 14 on which the flap swings in such bodily movement from the wing. However, when the flap is in its lowered positions from the wing, such as the maximum position of Fig. 10, it is to be noted that the pivot point 28 at the lower end of the crank 27 is spaced at a considerably greater distance from pivot pin 25, than the pivot pin 31 is spaced from pivot 25. Hence, upon rocking of the crank 27, about the fixed pivot 25, by swinging of flap F to increase its angle of attack, the short upper arm of the crank from 25 to 31 will move but slightly compared to the movement of the longer arm of the crank from 25 to 28.

In such manner, the flap F in its lowered position is actuated for lateral control substantially independently of and with but slight corresponding angular movement of aileron section A. Where the flap is swung downwardly to the angle increasing position for camber and wing lift increasing functioning, then likewise there is a slight downward swinging of the aileron sections A on a wing which serves in effect to slightly correspondingly increase the upper trailing surface camber of wing W and increase the efficiency of the high lift performance of the wing.

A variable lift wing of the flap type embodying the broad principles of my invention is very efficiently adapted for automatic flap operation, and purely as illustrative of such broad automatic operation, I have selected the form of my wing W in an automatic flap application thereof with a flap control system and lateral control system therefor, as applied in an airplane, and have more or less schematically illustrated the same in Fig. 12 of the drawings. In referring to Fig. 12, a body or fuselage of the airplane is diagrammatically indicated in part at B, while opposite extending wings W of the flap type hereinbefore described more or less in detail, are shown in part as disposed to extend from opposite sides of B in the usual relation.

Each wing W includes the flap F carried by the swinging arms 11, only one of which is shown, but the flap F of each wing is so designed and relatively positioned on the wing as to be automatically actuated to rotate to vary its angle of attack relative to the wing when in a bodily lowered position by the change in center of pressure acting on the flap relative to the flap axis of rotation 15a on the arms 11. For instance, with the conventional unstable airfoil, the center of pressure moves forward with increase in angle of attack, such movement being from approximately 40% of the chord at low angle of attack to approximately 30% at high angle of attack. As the flap is pivoted on axis 15a about ⅓ of the chord from the flap leading edge; then when a wing W is in its low angle of attack, the flap center of pressure tends to swing the flap to a negative angle setting; that is, maintain the flap against angle increase; because the center of lift is aft of the hinge point or axis 15a. However, when the wing W assumes high angles of attack, the center of lift moves forward of the flap hinge or axis of rotation 15a and acts thereon to rotate the flap to increased angle of attack position, that is, wing lift increasing position.

The bodily raising and lowering of the flap F of an automatic form of the wing W of Fig. 12, is carried out automatically by variation in speed. Since lift is increased proportional to the square of velocity, it follows that as the speed of flight of a wing W increases the lift or force acting on the flap increases and raises the flap; while as speed and resulting lift therefrom acting on the flap decreases, the flap bodily lowers to automatically increase the total lift developed by the combination of wing and flap. With the automatic form of flap, it is preferable to provide a force means acting on the flap F to maintain the flap lowered until a wing has attained a certain speed of flight; and such a means may take the form of a spring or other elastic member S shown in a wing W of Fig. 12, as will be more fully described hereinafter.

Referring to Fig. 12, with the wings W having the automatically operating flaps F, the cranks 21 of each wing that are coupled to the rods 20 for bodily raising and lowering the flaps, have the opposite ends of their cross arms 21b connected by the cables 32 so as to obtain parallel and equal vertical swinging of the flaps on the opposite wings W. The rearwardly extended end of the crank cross arm 21b of each crank is also connected with a force member or unit S, in the instant example in the form of a contractile spring that is secured to a fixed point on the wing and which constantly exerts a force on a crank 21 to swing the arm 21a thereof rearwardly to lower the flap through connecting rod 20.

The force members or springs S are designed so that the flaps F are moved downwardly with certainty with the wings W under low speed flight conditions to thus increase the wing lift, but as the speed of flight is increased the aerodynamic forces that are developed act upon the flaps to overcome the force members S and raise the flaps. When such forces attain a desired magnitude, the flaps are fully raised into their normal high speed positions recessed in the under surfaces of the wings. During such automatic raising and lowering of the flaps, if the cranks 18 of each wing are maintained fixed in their normal position, then, through links 16, the flaps are maintained against angle change relative to the wing and in their horizontal positions substantially parallel with the wings. However, in the automatic operation of this form of wing, the cranks 18 are not necessarily maintained fixed, as the air pressures on the flap resulting from angle of attack position of the wing will determine the angular setting of the flaps relative to the wing, regardless of the vertical position of the flaps.

In the arrangement of Fig. 12, the automatic angle of attack rotation of the wing flaps F of opposite wings W is carried out simultaneously and with substantial parallel motion by connecting the opposite ends of the cross arms 18b of cranks 18, with the cables 33. Under the action of changes in center of pressure acting upon the flaps F, as hereinbefore explained, the flaps when in their automatically bodily lowered positions will rotate on their axes 15a to vary their angles relative to the wing to thereby vary the lift capacity of the wing. Such rotation of the opposite flaps F will be equal and in the same direction through cables 33 connecting cranks 18, and links 16 connecting the cranks with the flaps.

A fully automatically functioning flap wing arrangement is thus provided in which the flaps F bodily raise and lower themselves. The angular relation of the flaps to the wing is entirely independent of their vertical location and tends to be at a positive angle of attack relative to the wing as an airplane is put into that attitude, due to the forward center of pressure movement on the flaps. However, when in the up position, there will be but little tendency for aileron and flap to pivot, and such tendency could be restrained mechanically if desired.

Attention is here called to the fact that if desired or found expedient, the separate flaps F of the wings W, need not be interconected for simultaneous, equal and parallel motion, but can be permitted to automatically function independently of each other.

Lateral control of the form of wings W of the wing arrangement of Fig. 12, is carried out in accordance with the invention through operation of the flaps F and aileron sections A, in normal high speed and low angle flight conditions, while with flaps F, bodily lowered under low speed or high angle of attack flight conditions, lateral control is essentially obtained through operation of opposite wing flaps F. In Fig. 12, a lateral control system is shown interconnected in the flap control system that is arranged to carry out such lateral control functioning of flaps F and aileron sections A.

For instance, a crank 34 is disposed intermediate wings W and between cables 33, in a horizontal position for swinging about a vertical pivot 35, with this crank in a normal, neutral control position substantialy parallel with cables 33. The opposite ends of crank 34 are connected by cables 36 with the usual pilot's control stick or lever 37 in fuselage B, so that lateral movements of the control stick will swing or rock the crank 34 on its pivot 35. One end of the crank 34, referring to Fig. 14 in connection with Fig. 12, is provided with horizontally disposed and axially alined upper and lower pulleys 38. A pair of pulleys 39 are mounted in fixed position spaced forwardly of this pulley carrying end of crank 34, and a similar pair of spaced pulleys 40 are mounted in fixed position spaced rearwardly of the crank pulleys 38. The forward cable 33 between cranks 18, passes around one of the pulleys 39 rearwardly to and around, say, the lower crank pulley 38, and then forwardly to and around the opposite pulley 39, thus forming a bight in the cable around one of the crank end pulleys. The rear cable 33 is similarly arranged and passes forwardly around one of the pulleys 40, to and around say the upper crank pulley 38, and then rearwardly to and around the opposite pulley 40. By such arrangement swinging of crank 34 moves the pulleys forward and rearward to shorten one cable 33 while at the same time lengthening the opposite cable 33, which results in swinging cranks 18 in the opposite direction.

In operation of such lateral control system, assume the wings W in low attack angle and high speed flight with the opposite wing flaps F automatically swung and maintained in normal raised position recessed in the under surface of aileron sections A, then swinging of the control stick laterally, say for example to the left, will swing the pulley carrying end of crank 34 forwardly and the opposite crank end rearwardly. Such crank movement will shorten the rear cable 33 to swing the right hand wing crank 18 to move link 16 rearwardly and swing its connected wing flap F downwardly to increased angle position. At the same time shortening of rear cable 33 swings left-hand wing crank 18 in a direction to move its link 16 forwardly to swing the left wing flap F upwardly to negative angle position. Due to the arrangement of interconnecting mechanism between flaps and aileron sections, as hereinbefore described, this differential swinging of the opposite wing flaps F is accompanied by corresponding swinging of the aileron sections A thereabove, so that the flaps and ailerons of the opposite wings are differentially actuated together as unit lateral control surfaces when the flaps are in normal raised position.

With the wings under high attack angle and/or low speed flight conditions with the wing flaps lowered and either in their substantially parallel relation to the wing, or in their automatically swung positions of increased angle of attack, it is the flaps themselves that form and are actuated as, lateral control surfaces for the wings. For instance, consider the wings W under low speed flight conditions and flaps F lowered to their lift increasing positions substantially parallel with the wings (Figs. 2 and 10), then actuation of the lateral control system through control stick 37, results in differential swing of the opposite wing flaps F for lateral control, but, due to the mechanism connecting the flaps with the aileron sections A thereabove, this lateral control actuation of flaps F is accompanied by relatively small corresponding movements of the sections A. Thus for the low speed conditions of the wings W, lateral control is essentially through the flap actuation and without substantial lateral control contribution by aileron sections A, which latter are in effect superseded by the flaps as lateral control surfaces.

When, however, the opposite wing flaps F are automatically rotated to their increased angle positions (Figs. 3 and 11) under high angle of attack flight conditions of wings W, the lateral control operation of these flaps by the control system is modified from an actual differential movement to an effective differential or lateral control result through reduction in angle of attack of one flap relative to the other. For example, stops 41 are provided as shown in Fig. 12, for engagement by the opposite wing flap cranks 18, respectively, in order to limit the increased or maximum angle of attack to which the opposite flaps can be rotated.

Now, when the flaps F are automatically rotated by high angle of attack flight conditions of wings W, to their maximum angles as determined by the opposite wing cranks 18 engaging against stops 41, the flaps are not subject to further rotation in a positive angle direction. Under these conditions the differential action of the flaps to establish the turning moments for lateral control are obtained by the rotation of one or the other of the ailerons, as may be desired, in a negative or angle decreasing direction, while the opposite aileron remains in its maximum angle position. Such operation of the flaps F takes place upon actuation of the control system by control stick 37. Lateral movement in one or the other direction of stick 37 swings crank 34 to shorten one cable 33 while lengthening the other, but as one of the flaps F is held against further positive rotation by a stop 41, then all of the motion is taken up by the cables and applied to the opposite flap F in a negative rotation of such flap to obtain the desired differential action for lateral control.

My invention also includes the manual control and operation of a wing thereof, and an example of manual control of the wings of the form of wings W in an airplane arrangement similar to Fig. 12, is schematically illustrated in Fig. 13. In the manual operation in accordance with the invention, the wing flaps F are under the selective control of the pilot for simultaneously bodily lowering the flaps to their horizontal, parallel relation with and below the wing for increasing lift by increasing effective area for the low speed flight condition, as in taking-off with the airplane, or for rotating the flaps when in their lowered positions to increase their angles relative to the wing with increase in drag and lift for the high attack angle flight condition, as in landing. Then interconnected with the manual flap control system for varying lift, is the lateral control system.

In the manual control arrangement of Fig. 13, the control stick 37 is connected by cables 36 to a horizontally disposed crank 42 swingable on the vertical axis 43, and similar to the crank 34 of Fig. 12. Crank 42 carries upper and lower pulleys 38 at both ends of the crank, and the cables 33 connecting the opposite wing cranks 18 pass around the sets of fixed pulleys 39 and 40 and the upper and lower crank pulleys 38, in a manner exactly similar to that described in connection with Fig. 12; the arrangement being a duplication of that of Fig. 12 at opposite ends of crank 42. Through this arrangement differential lateral control rotation of the opposite wing flaps F, is obtained as hereinbefore explained.

The manual control system for raising and lowering the wing flaps F and for angle varying rotation of these flaps, includes a T-crank 45 horizontally disposed for rotation about a vertical axis, and having the opposite ends of its cross arm 45a connected to the opposite cables 32, respectively, that connect the opposite wing cranks 21. A horizontally-disposed crank 46 is pivotally mounted on a vertical axis 46a intermediate its ends, with this crank mounted in fuselage B spaced forwardly of crank 45, and having the outer end thereof pivotally connected with the free end of central arm 45b of T-crank 45, by a link 47. A crank 48 is, in this particular instance, mounted for horizontal swinging on the axis 43 of lateral control crank 42, but entirely independently of crank 42. Crank 48 is normally disposed generally transversely with respect to crank 42, and a link 49 is pivotally connected between and couples the forward end of crank 48 with the end of crank 46 opposite that end of the latter crank that is pivotally connected to link 47. The opposite ends of the crank 46 are connected by the operating cables 50 to a manually rotated control member 51 in the fuselage B for pilot actuation, which member includes the cable drum 52.

Such manual flap operating and control system is actuated by rotating drum 52 to cause cables 50 to swing crank 46 in the desired direction and in turn through links 47 and 49 cause the desired swinging of cranks 45 and 48. With this control arrangement, when the pilot wishes to bodily lower the wing flaps F into their horizontal positions, substantially parallel with but without angle change relative to the wings W, that is, a position of Figs. 2 and 10, drum 52 is rotated to swing the crank 46 to move link 47 forwardly and locate the link 47 end of crank 47 at the point a. Such rearward movement of link 47 swings crank 45 with the end of its central arm 45b located at point b, and crank 45 actuates opposite wing cranks 20, through cables 32, to bodily lower the opposite wing flaps in a manner hereinbefore described. During the movement of crank 46 to position its outer end at point a, the opposite end of the crank and end of link 49 pivoted thereto, moves to point c, but as point c is the same distance from the forward end of crank 48, the link 49 imparts no turning movement to crank 48, and the flap rotating system connected therewith is not actuated to vary the flap angles relative to the wing. Thus, movement of crank 46 between its normal position and the position defined by a and c, results in bodily raising and lowering of the flaps F without angle change.

If the pilot desires to increase the lift by increasing the angle of attack of the wing flaps F, with the flaps in their bodily lowered positions, control drum 52 is rotated to swing crank 46 beyond the position defined by points a and c. This moves link 49 end of crank 46 from c to d and results in swinging the link 49 connected end of crank 48 to the point e. Such swinging of crank 48 actuates the cables 33 with which crank 48 is connected, to swing opposite wing cranks 18, and through links 16, to simultaneously and equally rotate the opposite wing flaps F to increased angle of attack positions of Figs. 3 and 11. During the flap angle increasing operation of the manual flap control system, the swinging of the link 47 connected end of crank 46, from the point a to the point f, is along the substantially flat portion of the radius relative to the point b at which the end of central arm 45b of crank 45 is then located, so that very small motion is transmitted to the crank 45 that controls bodily vertical movements of the flaps.

Lateral control in normal raised flap positions through unit swinging of the flaps F and aileron sections A thereabove, and through angular motion of the flaps F in their lowered positions, is had by operation of control stick 37 to swing lever 42, in a manner fully explained hereinbefore.

A modified mounting and operating arrangement for a flap of the invention is disclosed in Figs. 15 and 16 of the drawings, and is well adapted for use with the designs of wing typified in Figs. 4 and 5 of the drawings. Using the wing of Fig. 4 as an example, and referring to Figs. 15 and 16, the flap F is recessed in the under, trailing surface of wing W' and is supported on a series of sliding rods 60, only one of which is here shown, for bodily downward and rearward movement to lowered, lift increasing positions. Each rod 60 is slidably supported in a bearing 61 that is carried in fixed position on a rigid truss 62 extended rearwardly from the wing spar 63. The lower end of the rod 60 is pivotally coupled to the spar 64 of the flap spaced rearwardly from the flap leading edge, such a pivotal coupling being shown at 65. A T-crank 66 is provided for each rod 60 and is mounted in downwardly and rearwardly inclined position, say from the rigid truss 62. The central arm 66a of this crank is pivotally connected to the upper end of sliding rod 60, while suitable operating cables 67 are connected to opposite ends of the crank cross arm 66b. By rotating crank 66, the rod 60 is slid downwardly and rearwardly to bodily lower the flap to the rearwardly disposed position spaced below the wing as shown in Fig. 4 and also shown by flap F'' of Fig. 5.

Primarily for the purpose of preventing the flap F' from assuming a negative angle when the flap is of the automatically functioning type, the flap spar 64 carries a forwardly projecting portion for engagement by a rod 60 when the flap is in a normal or minimum angle of attack position, as will be clear by reference to Fig. 15 of the drawings.

A further feature of such a flap mounting and control is the provision of what may be aptly termed an eccentric spring 68 connected at one end thereof to the forward end of a crank cross arm 66b, and functioning as a force means capable of changing its signs of force as applied to flap F, for the purpose of holding the flap in a particular adjusted position against the disturbing effects of air disturbances on the flap. Such spring means 68 may also be utilized in controlling the angle of the flap. This feature of my invention is of general application to any type of flap and flap motion, and it is shown here in a specific adaptation merely for purposes of example and to illustrate its functioning and the broad principles on which based. The invention includes all the various adaptations thereof within its scope as defined by the claims thereto hereinafter appended.

With an arrangement of flap mounting of Figs. 15 and 16, control systems of the arrangements hereinbefore described can be applied and utilized, and it should also be noted that the crank operating cables 67 can be employed with opposite wing flaps for parallel flap motion in automatic forms of the wings, or for mutual control of the flaps in such forms.

The wing embodiments and operating and control systems therefor, of the invention are presented herewith purely as examples to illustrate and permit of explaining the broad principles and features of my invention by which a variable or high lift wing of the flap type, either manually or automatically operable, has a flap movable to a lift increasing position spaced from and substantially parallel with, or without changing its normal angle relative to the wing, and also movable in its raised or any lowered position to increase its angle of attack, and which flap is also operable in its lift increasing positions as a lateral control surface. As a result of these fundamental characteristics, a wing of the invention has a wider range of performance and offers a selective functioning within its operating range to meet the particular flight conditions as encountered.

While in the manually controlled arrangement of Fig. 13, a single pilot control 51 is disclosed for causing in sequence lowering of the flap and rotating thereof to increased angles, it is to be understood that my invention contemplates and includes separate manual controls for bodily raising and lowering the flap, and for rotating the flap for angles changes.

It is also evident that various modifications, changes, variations, substitutions, eliminations and additions might be resorted to without departing from the spirit and broad scope of my invention, and hence, I do not wish to limit my invention to the exact and particular disclosures hereof that are made essentially by way of example and not of limitation.

Desiring to protect my invention in the broadest manner legally possible, what I claim is:

1. In a variable lift wing, a flap in normal raised position forming a portion of the normal under surface contour of the wing, means for bodily lowering said flap to position spaced below the wing in lift capacity increasing relation therewith, said flap rotatable on a horizontal axis longitudinally thereof to vary the flap angle of attack, means for rotating said wing, and said wing rotating means in normal inactive position maintaining the flap against angle change relative to the wing during bodily lowering and in lowered positions of the flap.

2. In a variable lift wing, a trailing vertically swingable aileron forming a portion of the upper surface of the wing, a wing flap mounted on the wing for vertical swinging and forming a portion of the trailing under surface of the wing below said aileron, said flap bodily lowerable without substantial angle change relative to the wing to position spaced therebelow in lift capacity increasing relation therewith, said flap in normal raised position vertically swingable with said aileron as a unit surface for lateral control, and the flap in bodily lowered position vertically swingable for lateral control substantially independently of said aileron.

3. In a variable lift wing, an aileron vertically swingable on and forming a portion of the upper surface of the wing, a wing lift varying flap mounted on the wing in normal position forming a portion of the under surface of the wing below said aileron, said flap vertically swingable, means for vertically swinging said flap, means coupling said flap and aileron for swinging thereof together as a unit control surface with the flap in normal position, means for bodily lowering said flap into lift increasing position spaced below the wing, and said flap vertically swingable in lowered position for lateral control, said flap and aileron coupling means in lowered position of the flap and flap lateral control rotation transmitting relatively small corresponding movements to said aileron.

4. In a variable lift wing, a flap in normal position forming a portion of the normal under surface contour of the wing, said flap bodily lowerable without substantial angle change relative to the wing to a lift increasing position spaced below the wing, said flap vertically swingable to increase its angle of attack in lowered position relative to the wing, and pilot actuated control means for operation through a predetermined range to successively bodily lower said flap and then swing the flap to increase its angle of attack, respectively, said means bodily moving the flap to a lowered position without angle change prior to vertical swinging of the flap by continued operation of said means.

5. In a variable lift wing, a flap in normal position forming a portion of the normal under surface contour of the wing, said flap bodily lowerable without substantial angle change relative to the wing to a lift increasing position spaced below the wing, said flap also rotatable about an axis longitudinally thereof to change its angle relative to the wing, mechanism for bodily lowering said flap, mechanism for rotating the flap to vary its angle relative to the wing, said flap varying mechanism normally functioning to maintain the flap against angle change during bodily lowering thereof, and pilot actuated control means for operating said flap lowering and flap rotating mechanisms.

6. In a variable lift wing, opposite wing flaps in normal position forming a portion of the normal under surface contour of the wing, said flaps bodily lowerable without substantial angle change relative to the wing to positions spaced below the wing in lift increasing relation with the wing, means for bodily lowering and raising said flaps, the flaps also mounted for vertical rotation to vary their angles of attack relative to the wings, and said flap rotating means operatively associated with the flaps to maintain the flaps normally against angle change during bodily raising and lowering of the flaps.

7. In a variable lift wing, opposite wing flaps in normal position forming a portion of the under trailing surface of the normal under surface contour of the wing, ailerons mounted on the wing above said flaps for vertical swinging and in normal position forming a portion of the upper trailing surface of the wing, said flaps mounted for vertical swinging to vary their angles of attack relative to the wing, in normal position, the flaps vertically differentially swingable as units with the ailerons, respectively, for lateral control, said flaps simultaneously lowerable without substantial change relative to the wing into lift increasing position spaced below the wing, means for lowering and raising said flaps, means for simultaneously rotating the flaps when in bodily lowered positions to increase the flap angles of attack, and lateral control mechanism for differentially rotating the flaps for lateral control in any vertical position of the flaps.

8. An automatically operating variable lift wing including, a wing flap of airfoil section mounted on the wing for vertical bodily movements between a normal raised position on the wing and lowered positions spaced below and in lift capacity increasing relation with the wing, said flap vertically bodily moved by the lift developed from air reaction on the flap in accordance with speed of flight of the wing to raise to normal position under high speed conditions and to lower as the speed of flight and flap lift decreases, and the said flap also mounted for vertical rotation on a longitudinal axis to vary its angle of attack, rotation of the flap being caused by center of pressure movement thereon to increase and decrease flap attack angle as the wing angle of attack increases and decreases in flight.

9. An automatically operating variable lift wing including, a wing flap mounted on the wing for vertical bodily movements between a normal raised position on the wing and lowered positions spaced bodily below the wing, said wing flap also free to rotate vertically in bodily lowered positions about an axis spanwise thereof to vary the flap angle of attack, and the flap having its axis of vertical rotation so located thereon relative to the center of pressure that the flap is automatically rotated in accordance with center of pressure movements caused by changes in wing angle of attack.

10. An automatically operating variable lift wing including, a wing flap mounted on the wing for vertical bodily movements between a normal raised position on the wing and lowered positions spaced bodily below the wing in lift increasing relation therewith, said flap vertically bodily moved by the lift developed thereby in flight to raise to normal position under high speed flight and to lower from normal position as the speed of flight decreases, force means normally tending to maintain the flap lowered until a predetermined speed of flight is attained, said flap also mounted for vertical rotation to vary its angle of attack, rotation of the flap to vary its angle of attack being caused by center of pressure movement thereon as the angle of attack of the wing varies.

11. In a variable lift wing, a lift increasing wing flap recessed in the trailing under side of the wing in normal position forming a portion of the normal under surface contour of the wing, said flap bodily lowerable to a position spaced below the wing in lift-increasing relation therewith disposed aft of its normal raised position, and in bodily lowered position said flap mounted for vertical rotation to vary its angle of attack.

12. In a variable lift wing, a trailing vertically swingable aileron thereon, a wing flap normally in position recessed in the under side of the wing forwardly of said aileron and forming a portion of the normal under surface contour of the wing, and said wing flap bodily movable downwardly and rearwardly to position bodily spaced below the wing and aileron and increasing the effective area of the wing.

13. In a variable lift wing, a wing flap mounted thereon for bodily lowering therefrom to positions spaced below and in area and lift increasing relation with said wing, and means for supporting and bodily moving said flap, including a rearwardly and downwardly inclined member for vertical sliding to bodily lower the flap downwardly and rearwardly from the wing.

14. A variable lift wing, including a wing flap at the under side thereof, said flap mounted for automatic lowering from the wing to lift increasing positions bodily spaced below the wing in accordance with wing flight conditions, and force means operatively associated with the flap and changing signs of the forces applied to the flap as the flap raises and lowers to maintain the flap in automatically assumed positions against the effects of minor air disturbances.

15. In a variable lift wing, a lift varying member movably mounted on the wing and automatically actuated by varying airflow conditions thereon to change the lift capacity of the wing, in combination with a force means operatively associated with and applying forces to said lift varying member, said force means changing signs of the forces applied to the member as the member is moved by the varying airflow conditions to maintain the member in its automatically assumed positions against the effects of minor air disturbances on the member.

16. In a variable lift wing, a wing flap swingably mounted on the wing and in normal position on the wing within the normal wing contour, said wing flap bodily vertically swingable from normal position without substantial change in the normal position angle of the flap relative to the wing to a position spaced from the wing in wing lift capacity increasing relation with the wing, the said flap also being mounted for rotation vertically to change its angle relative to the wing, and means for maintaining said flap against angle changing rotation thereof during bodily vertical swinging to and from its normal position on the wing.

17. In a variable lift wing, a lift varying wing flap swingably mounted on the wing and in normal position disposed on the wing within the normal wing contour, said wing flap bodily vertically swingable from its normal position without substantial change in the normal position angle of the flap relative to the wing to a position spaced bodily from the wing in relation with the wing to increase the normal lift capacity thereof, the said flap also being mounted for vertical rotation to change its angle relative to the wing, and means operatively coupled with the flap for vertically rotating the same to change the flap angle relative to the wing to further vary the lift capacity of the wing.

18. In a variable lift wing, a wing flap swingably mounted on the wing and in normal position forming a part of the normal wing contour, said flap bodily vertically swingable from its normal position without substantial change in the normal position angle of the flap relative to the wing to a position spaced bodily from the wing in aerodynamic interrelation therewith to increase the normal lift capacity of the wing, the said flap being also mounted for vertical rotation to change its angle relative to the wing. and normally inactive means operatively associated with the wing flap for operation to rotate the flap to change its angle, said means when in normal inactive position maintaining the wing flap against angle change during bodily vertical swinging thereof to and from normal position on the wing.

19. In a variable lift wing, a wing flap normally positioned at the under surface of the wing, a mounting for the flap including an arm pivotally mounted on the wing for vertical swinging toward and from the wing, said flap pivotally mounted on the arm for vertical rotation to change the angle of the flap relative to the wing and bodily vertically swingable with the arm to and from position spaced from the wing in lift increasing relation therewith, means for maintaining the flap against change in its normal position angle relative to the wing during bodily vertical swinging of the flap, and means for vertically rotating the flap on the arm to change the angle of the flap relative to the wing.

20. In a variable lift wing, a wing flap normally positioned at the under surface of the wing, a mounting for the flap including an arm pivotally mounted on the wing and vertically swingable toward and from the wing, said flap mounted on and carried by said arm for vertical bodily swinging between its normal position and a wing lift increasing position bodily spaced below the wing, the flap pivotally mounted on the arm for relative movements between the flap and arm, and means for maintaining the flap against substantial change in its normal position angle relative to the wing when bodily swung downwardly to lift increasing position spaced below the wing.

21. In a variable lift wing, in combination, opposite lateral control surfaces on the wing, opposite wing flaps in normal position forming portions of the normal wing under surface contour, said flaps bodily movable to lowered positions spaced below the wing in wing lift increasing relation therewith, said flaps vertically rotatable to vary their angles of attack relative to the wing, means for simultaneously rotating said flaps to increased angle positions, means for differentially rotating said flaps for lateral control functioning, and connections between said flaps and ailerons for differentially operating the latter upon lateral control operation of said flaps.

22. In an automatically functioning variable lift wing, opposite wing flaps mounted on the wing for vertical bodily movements between a normal raised position on the wing and lowered lift increasing positions spaced below the wing, said flaps automatically bodily moved by the air reaction thereon to raise to normal position under high speed conditions and to lower as the speed of flight decreases, operative connections between said opposite flaps for substantially parallel bodily vertical movements thereof, the said flaps mounted for vertical rotation on longitudinal axes to vary their angles of attack, the flap axes of rotation so located thereon relative to the flap centers of pressure that the flaps are automatically rotated in accordance with center of pressure movements resulting from changes in the angle of attack of the wing, and lateral control mechanism operatively coupled with the connections between said flaps for imposing a differential rotation on the automatically functioning flaps for lateral control.

23. In a variable lift wing, a wing lift capacity increasing flap at the under side of the wing in normal position forming a portion of the normal under surface contour of the wing, means mounting said flap on the wing for bodily lowering of the flap from normal position bodily spaced below the wing in lift increasing relation therewith but bodily moved rearwardly of the normal position of the flap, said means maintaining the flap against substantial angle change relative to the wing during bodily lowering and in lowered and rearwardly moved position, and mechanism for bodily lowering and rearwardly moving said flap from normal position and for raising and forwardly moving said flap to normal position on said mounting means.

24. In a variable lift wing, a lift varying wing flap in normal raised position recessed in the under surface of the wing to form a portion of the normal wing contour, means carried by and supported from the wing and on which said wing flap is mounted and supported for bodily lowering and raising the flap from and to normal raised position on the wing, said means in normal raised and recessed position of the flap substantially removed from the airflow beneath the wing, and the said means lowering the wing flap to position bodily spaced below the wing without change in the angle of the flap relative to the wing.

25. In a variable lift wing, a wing lift varying flap member in normal position disposed at and forming a portion of the under surface of the normal contour of the wing, means supported from the wing for bodily vertical movements thereon, said flap mounted and supported on said means for bodily lowering movement thereby and therewith to wing lift increasing position spaced below the wing, said means adapted to lower the flap to wing lift increasing position without changing the angle of the flap relative to the wing, and said flap mounted on said wing carried means for vertical rotation thereon in lowered lift increasing position to vary the angle of attack of the flap.

26. In combination, a wing, a wing lift increasing flap member on the wing bodily movable from normal position thereon to a position spaced from the wing, means bodily vertically movable supported on and from the wing and on which said flap member is mounted for movement bodily therewith to and from normal position on the wing, said means bodily vertically moving the flap member to position bodily spaced from the wing without changing the angle of the member relative to the wing, and said flap member mounted on said means for vertical rotation to vary its angle of attack when in position bodily spaced from the wing.

27. In combination, a wing, a wing lift increasing flap normally positioned at the wing to form a portion of the normal contour of the wing, a mounting for the flap providing a member mounted on the wing for movement toward and from the wing, said flap mounted on and carried by said member for vertical bodily movement between the normal position of the flap at the wing and a wing lift increasing position of the flap spaced bodily from the wing without change in the angle of the flap relative to the wing, and the flap mounted on said wing mounted member for movement thereon to change the angle of the flap relative to the wing.

28. In combination, a wing, a wing lift increasing flap normally positioned at the under surface of the wing and forming a portion of the normal wing contour, a mounting for the flap providing a member supported on the wing for movement toward and from the wing, said flap mounted on and carried by said member for bodily vertical movement between the normal raised position of the flap at the under surface of the wing and lowered lift increasing position of the flap spaced beneath the wing, and means for normally maintaining said flap in position on said member against change in its normal position angle relative to the wing when moved downwardly to lift increasing position spaced beneath the wing.

29. In combination, a wing, a wing lift increasing flap bodily movably mounted on and supported from the wing, said flap in normal raised position disposed at and forming a portion of the under surface of the normal wing contour and bodily lowerable from the wing into lift increasing position spaced below but supported from the wing without change in the normal position angle of the flap relative to the wing, means on the wing bodily movably supporting the flap on and from the wing, and means for normally maintaining the flap against angle change during bodily lowering of the flap.

30. In combination, a wing, a wing flap mounted on the wing in normal position forming a portion of the normal wing contour and vertically bodily movable from normal position bodily to position spaced from the wing, said flap mounted for vertical rotation to vary the flap angle of attack, the axis of vertical rotation of the flap located to the rear of the flap leading edge to provide a forwardly extended portion of the flap forming a balance therefor, and means for rotating said flap operatively coupled thereto for applying rotating forces to the flap at a point vertically spaced from the flap axis of rotation.

31. In combination, a wing, a wing flap of the balanced type mounted on the wing in normal raised position at the under surface of the wing as a part of the normal wing contour, said flap mounted on the wing for bodily lowering therefrom to position bodily spaced from the wing, said balanced flap being also mounted for vertical rotation in lowered position to vary its angle of attack, and means for rotating said flap operatively coupled therewith at a point adjacent but spaced from the flap axis of rotation.

32. In combination, a wing, a lateral control surface thereon formed of an upper section and a lower section forming a wing flap, said sections in normal position thereof movable together as a unit lateral control surface, and said lower flap forming section bodily movable from the wing into lift increasing position spaced below the wing.

33. In combination, a wing, a lateral control surface thereon formed of sections in normal position vertically swingable together as a unit control surface, one of said sections bodily vertically movable from the other section and the wing into position bodily spaced from the wing and forming a wing lift increasing flap member, and said bodily movable section in lift increasing position spaced from the wing, vertically swingable for lateral control.

34. In a variable lift wing, a wing flap having a small chord relative to the chord of the wing, said flap in normal raised position at and forming the trailing portion of the normal wing under surface and mounted on the wing for bodily lowering to positions spaced below the trailing portion of the wing without change in the angle of attack of the flap relative to the wing, support means for the flap movably mounted on the wing for bodily vertically moving the flap relative to the wing, the flap mounted on said support means for vertical rotation thereon about a longitudinal axis to vary the flap angle of attack, and pilot controlled means for lowering the flap without angle change relative to the wing and for rotating the flap on said support means to change its angle of attack.

35. In a variable lift wing, in combination, a trailing wing flap in normal position recessed in and forming the trailing portion of the normal wing under surface contour, the chord of said trailing flap less than one half the chord of the wing, said trailing flap bodily vertically movable to lowered positions spaced below but in proximity to the wing, means for raising and lowering said trailing flap, said means providing a maximum lowered position for the flap in which the flap is spaced below the wing still within and aerodynamically reacting with the airflow along the under surface of the wing between the wing and lowered flap, and the said trailing flap in lowered position vertically rotatable to increased angles of attack with the flap leading edge portion positioned to form a reduced gap between the flap leading edge and wing under surface to increase the air circulation about the combination of wing and flap to further increase the lift of the wing.

36. In a variable lift wing, in combination, a lift varying wing flap having a chord less than one-half the chord of the wing, said flap mounted on the wing in normal position at and forming the trailing portion of the normal under surface contour of the wing, said flap bodily vertically movable to a maximum lowered position spaced below but in proximity to the trailing portion of the wing thereabove to form an air passage between the wing and flap for and receiving the rearwardly moving airflow along the under surface of the wing in aerodynamic relation with the flap to increase the lift of the wing, means limiting the downward movement of the flap to said maximum lowered position, and said trailing flap in lowered position vertically rotatable to increased angles of attack with the flap leading edge portion moved toward the wing under surface thereabove to reduce the gap between such surface and the flap leading edge to increase air circulation about the combination of wing and flap to further increase wing lift.

37. In combination, a wing, a wing flap mounted on the wing in normal position forming a portion of the normal wing contour, said flap mounted for bodily vertical movement to position spaced from the wing and for vertical rotation about a longitudinal axis to vary its angle of attack relative to the wing, means for mounting and supporting said flap on and from the wing, said flap mounted and pivotally supported on said means at the longitudinal axis of vertical rotation of the flap and said axis located to the rear of the flap leading edge to provide a forwardly extended portion of the flap forming an aerodynamic balance, and means for applying vertical rotating forces to the flap, said means coupled to the flap to the rear of the flap axis of vertical rotation.

38. In an automatically functioning variable lift wing, opposite wing flaps mounted on the wing for vertical bodily movements between a normal raised position on the wing and lowered lift increasing position spaced below the wing, said flaps automatically bodily moved by the air reaction thereon to raise to normal position under high speed conditions and to lower as the speed of flight decreases, the said flaps mounted for vertical rotation to vary their angles of attack and the flap axes of rotation so located relative to the flap centers of pressure that the flaps are automatically rotated in accordance with the center of pressure movements resulting from changes in the angle of attack of the wing, and lateral control means operatively associated with said flaps for imposing a differential rotation on the automatically functioning flaps for lateral control.

39. In a variable lift wing, a flap in normal position forming a portion of the normal under surface contour of the wing, said flap mounted for lowering bodily from normal position without substantial angle change relative to the wing to a lift increasing position spaced below the wing, said flap vertically rotatable to increase its angle of attack when in lowered position, pilot controlled mechanism for bodily lowering said flap to a predetermined position and then rotating the flap to increase its angle of attack, and means associated with said flap for rotating the same to vary its angle of attack in lowered positions independently of said lowering mechanism.

40. In a variable lift wing, opposite wing flaps each having a chord less than one-half the chord of the wing, said flaps in normal position forming a portion of the normal under surface contour of the wing and mounted for lowering from normal position without substantial angle change relative to the wing to position spaced below the wing in wing lift increasing relation therewith, means for simultaneously vertically swinging said flaps to increase their angles of attack relative to the wing, and means for differentially rotating said flaps for lateral control functioning thereof independently of said first mentioned means when the flaps are in bodily lowered position.

41. In a variable lift wing, opposite wing flaps in normal position forming a portion of the normal contour of the wing, said flaps simultaneously bodily movable from normal position without substantial angle change relative to the wing to positions spaced from the wing in wing lift increasing relation therewith, said flaps simultaneously vertically swingable to increase their angles of attack relative to the wing to further increase lift capacity of the wing, the portions of the wing overlapping said flaps formed for vertical swinging of the flaps when in their normal position, and means for differentially rotating said wing flaps for lateral control in any position of the flaps relative to the wing.

42. In a variable lift wing, opposite wing flaps each having a chord of less than one-half the chord of the wing, said flaps in normal position disposed at and forming a portion of the normal trailing under surface contour of the wing and mounted for bodily movement to lowered positions spaced below the wing without substantial angle change relative to the wing, said flaps vertically rotatable to vary their angles of attack relative to the wing, means for simultaneously rotating said flaps to increased angle of attack positions, and pilot controlled mechanism for differentially rotating said opposite flaps for lateral control functioning thereof.

43. In a variable lift wing, opposite wing flaps in normal position forming portions of the normal under surface contour of the wing, said flaps mounted for simultaneous bodily lowering to position spaced below the wing in lift increasing relation with the wing, said flaps also mounted for vertical rotation to vary their angles of attack, mechanism for progressively simultaneously lowering said flaps without substantial angle change relative to the wing to a predetermined lowered position and then simultaneously rotating said flaps to increase their angles of attack, and pilot actuated means for differentially rotating said flaps for lateral control independently of the operation of said flaps by said mechanism.

44. In a variable lift wing, in combination, a lift varying wing flap having a small chord relative to the chord of the wing, said flap mounted on the wing in normal position forming a part of the normal wing under surface contour and bodily vertically movable from normal position to a maximum lowered position spaced below the rearward portion of but in proximity to the wing a distance less than the chord of said flap to form an air passage between the wing and flap for the airflow along the under surface of the wing to pass rearwardly therethrough in aerodynamic reaction with the lowered flap, whereby the lift of the combined wing and flap is increased, and said flap in lowered position vertically rotatable to increase its angle of attack and to position its leading edge portion to reduce the size of the air inlet to the passage between the flap and wing to thereby augment the air circulation about the combination of wing and flap to further increase the lift of the combination.

45. In a variable lift wing, in combination, a lift varying wing flap having a chord less than one-half the chord of the wing, said flap mounted on the wing in normal position forming a portion of the normal wing under surface and bodily vertically movable from normal position to a maximum lowered position spaced below the wing a distance less than the chord of said flap to form an air passage between the wing and flap for the airflow along the under surface of the wing to pass rearwardly therethrough in aerodynamic reaction with and between the lowered flap and wing, and said flap in lowered position vertically rotatable to increase its angle of attack and to reposition its leading edge portion to reduce the size of the air inlet to the passage between the flap and wing whereby the air circulation about the combination of wing and flap is augmented to increase the lift of the combination of lowered flap and wing.

THEODORE P. HALL.